US012717644B2

(12) United States Patent
Ashbaugh et al.

(10) Patent No.: US 12,717,644 B2
(45) Date of Patent: Aug. 25, 2026

(54) DATA PARALLEL PROGRAMMING-BASED TRANSPARENT TRANSFER ACROSS HETEROGENEOUS DEVICES

(71) Applicant: Intel Corporation, Santa Clara, CA (US)

(72) Inventors: Ben J. Ashbaugh, Folsom, CA (US); Michael Kinsner, Halifax (CA); James Brodman, Marlborough, MA (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/693,010

(22) Filed: Mar. 11, 2022

(65) Prior Publication Data

US 2022/0197715 A1 Jun. 23, 2022

(51) Int. Cl.
*G06F 9/50* (2006.01)

(52) U.S. Cl.
CPC .......... *G06F 9/5077* (2013.01); *G06F 9/5016* (2013.01); *G06F 9/5044* (2013.01); *G06F 9/5083* (2013.01); *G06F 2209/503* (2013.01); *G06F 2209/508* (2013.01)

(58) Field of Classification Search
CPC .... G06F 9/5077; G06F 9/5016; G06F 9/5044; G06F 9/5083; G06F 2209/503; G06F 2209/508
See application file for complete search history.

(56) References Cited

U.S. PATENT DOCUMENTS 10,802,871 B1 * 10/2020 Memon .................. G06F 9/485
2012/0054771 A1 * 3/2012 Krishnamurthy ..... G06F 9/5088 718/105
2020/0259836 A1 * 8/2020 Kumar ................ G06F 21/6209
2020/0409748 A1 * 12/2020 Bernat .................. G06F 9/5088
2022/0214902 A1 * 7/2022 Zhao ..................... H04L 9/3236
2022/0413732 A1 * 12/2022 Blinzer .................. G06N 20/00
2023/0281153 A1 * 9/2023 Hansen ............. G06F 15/17331 709/212
2023/0367648 A1 * 11/2023 Xing ..................... G06F 9/5044

* cited by examiner

*Primary Examiner* — Sisley N Kim
(74) *Attorney, Agent, or Firm* — JAFFERY WATSON HAMILTON & DESANCTIS LLP

(57) ABSTRACT

An apparatus to facilitate data parallel programming-based transparent transfer across heterogeneous devices is disclosed. The apparatus includes a processor to: identify a change in device status that triggers a device transfer process from an original device, wherein the original device is associated with a queue of an application program of a data parallel programming runtime; identify a new device that is compatible with the original device; migrate at least one of a state or data of the original device to the new device; logically map, without user intervention, the queue to the new device in the data parallel programming runtime; and initiate execution of the application program on the new device using the queue.

20 Claims, 6 Drawing Sheets

DATA PARALLEL PROGRAMMING-BASED TRANSPARENT TRANSFER ACROSS HETEROGENEOUS DEVICES

FIELD

This disclosure relates generally to data processing and more particularly to data parallel programming-based transparent transfer across heterogeneous devices.

BACKGROUND OF THE DISCLOSURE

The use of hardware accelerators (e.g., graphics processing units (GPU), programmable logic devices, etc.) has enabled faster workload processing and has emerged as an effective architecture for acceleration of Artificial Intelligence (AI) and Machine Learning (ML) use cases. Meanwhile, the growing popularity of AI and ML is increasing the demand for virtual machines (VMs).

A programmable logic device (or programmable integrated circuit (IC)) (e.g., field programmable gate array (FPGA)) is one type of hardware accelerator that can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party such as a cloud service provider.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

DETAILED DESCRIPTION

Figure 1:
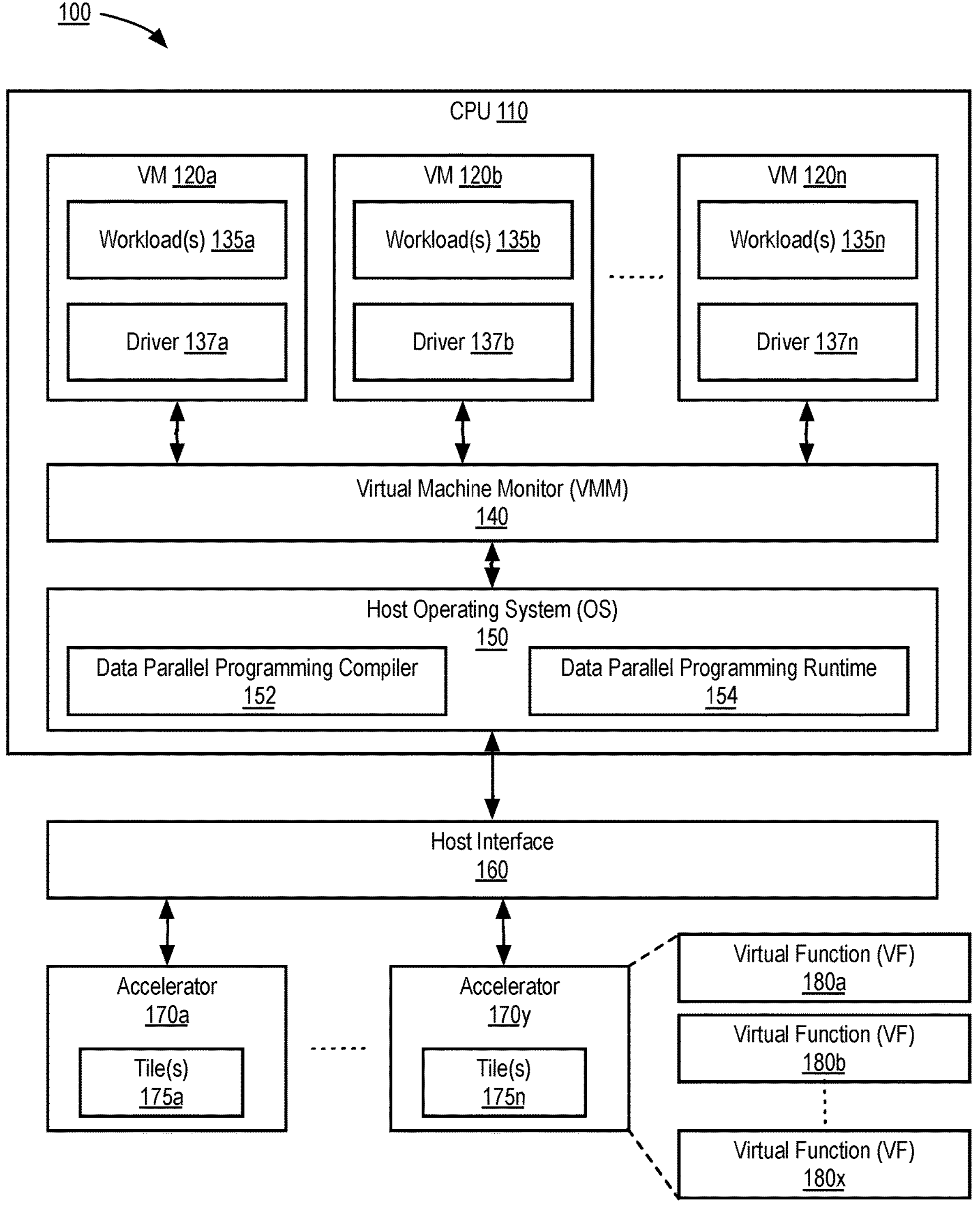
FIG. 1 is a block diagram illustrating a host system for data parallel programming-based transparent transfer across heterogeneous devices, according to some embodiments.

Implementations of the disclosure are directed to data parallel programming-based transparent transfer across heterogeneous devices. The use of hardware accelerators (e.g., specialized central processing units (CPUs), graphics processing units (GPU), programmable logic devices, etc.) has enabled faster workload processing and has emerged as an effective architecture for acceleration of Artificial Intelligence (AI) and Machine Learning (ML) use cases. Obtaining high computer performance on hardware accelerators relies on use of code that is optimized, power-efficient, and scalable. The demand for high performance computing continues to increase due to demands in AI, ML, video analytics, data analytics, as well as in traditional high-performance computing (HPC).

Workload diversity in current applications has resulted in a corresponding demand for architectural diversity. No single architecture is best for every workload. A mix of scalar, vector, matrix, and spatial (SVMS) architectures deployed in CPU, GPU, AI, and field programmable gate array (FPGA) accelerators, to name a few examples, can be used to provide the performance for the diverse workloads.

Furthermore, coding for CPUs and accelerators relies on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as data parallel C++ (DPC++) programming language. The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that best accelerates the workload. A host is available to simplify development and debugging of device code.

With respect to the hardware that accelerates the workload, a variety of accelerators may be utilized herein. A hardware accelerator device (also referred to herein as an accelerator, accelerator device, hardware accelerator, and so on) may refer to a coprocessor that can be configured to perform a specialized set of graphics, media, or compute operations, for example. An accelerator may include, but are not limited to, a specialized CPU, GPU, or programmable logic device (also referred to as a programmable integrated circuit (IC)).

Some implementations may utilize programmable logic devices (e.g., field programmable gate array (FPGA) or application-specific integrated circuit (ASIC)) as one type of hardware accelerator that can be configured to support a data parallel programming model. In some implementations, the programmable logic device can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party, such as a cloud service provider (CSP).

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As previously described, the use of hardware accelerators has enabled faster workload processing and has emerged as an effective architecture for acceleration of diverse workloads. Workload diversity in applications relies on architectural diversity in the underlying computing platform. A mix of scalar, vector, matrix, and spatial (SVMS) architectures deployed in CPU, GPU, AI, and field programmable gate array (FPGA) accelerators can be used to provide the performance for the diverse workloads.

In an architecturally diverse platform, coding for CPUs and accelerators relies on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as the DPC++ programming language. The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that best accelerates the workload. A host is available to simplify development and debugging of device code.

A data parallel programming model may be a queue-based heterogeneous accelerator programming model that creates a queue which is tied to a specific accelerator or specific type/class of accelerator. In conventional data parallel programming models, when a device is removed or de-provisioned from a system for any one of a variety of reasons, such as hardware resource rebalancing or prediction of imminent failure, submissions to the queue fail. Queue failures can lead to abnormal program termination unless an application is explicitly developed to handle such errors. Both abnormal termination and structuring of a program to gracefully handle such errors is expensive and degrades the usefulness of data parallel programming models in various deployments.

To address the above-noted technical drawbacks, implementations of the disclosure provide for data parallel programming-based transparent transfer across heterogeneous devices. Implementations herein provide for a data parallel programming runtime that can transparently switch to another compatible device underlying a queue when there is a notification of de-provisioning from a system management framework. In implementations herein, an alternate device can become active without user intervention such that workloads continue to execute, even though the queue was originally bound to a different device and even though the user had no way to rebind the queue manually.

A further extension of implementations herein includes enabling automatic migration to a more-efficient device when one becomes available, either because the more-efficient device was newly provisioned into the system at runtime, or because the more-efficient device has become less loaded with other computational work. The data parallel programming model operates to provide explicit user control over the binding between a queue and specific device. However, implementations of the disclosure can treat that binding as a logical binding and perform automatic migration for efficiency.

Implementations herein provide for transparent runtime transfer of devices in a 1:1 queue-based heterogeneous programming framework. As such, implementations provide for technical advantages including improved robustness of the computing environment and ease of use, particularly in large scale deployments. Moreover, implementations of the disclosure provide for improved compute resource efficiency resulting from reduced queue failure error handling occurrences and improved resource allocation for workloads of an application to execute on. Furthermore, existing conventional failover techniques are not exposed to data parallel programming queue-based programming, yet implementations herein expose this capability for improved accelerator design as well as scheduling and reconfigurability with data parallel programming management in terms of regeneration of kernels and routing.

FIG. 1 is a block diagram illustrating a host system 100 for data parallel programming-based transparent transfer across heterogeneous devices, according to some embodiments. In some embodiments, host system 100 may include a computer platform hosting an integrated circuit ("IC"), such as a system on a chip ("SoC" or "SOC"), integrating various hardware and/or software components of computing device 100 on a single chip.

As illustrated, in one embodiment, host system 100 may include any number and type of hardware and/or software components, such as (without limitation) central processing unit ("CPU" or simply "application processor") 110, graphics processing unit ("GPU" or simply "graphics processor"), graphics driver (also referred to as "GPU driver", "graphics driver logic", "driver logic", user—mode driver (UMD), user—mode driver framework (UMDF), or simply "driver"), hardware accelerators 170*a-y* (such as programmable logic device 10 described above with respect to FIGS. 1-7 including, but not limited to, an FPGA, ASIC, a re-purposed CPU, or a re-purposed GPU, for example), memory, network devices, drivers, or the like, as well as input/output (I/O) sources, such as touchscreens, touch panels, touch pads, virtual or regular keyboards, virtual or regular mice, ports, connectors, etc. Host system 100 may include a host operating system (OS) 150 serving as an interface between hardware and/or physical resources of the host system 100 and a user.

It is to be appreciated that a lesser or more equipped system than the example described above may be utilized for certain implementations. Therefore, the configuration of host system 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In the context of the examples herein, the host system 100 is shown including a CPU 110 running a virtual machine monitor (VMM) 140 and host OS 150. The host system 100 may represent a server in a public, private, or hybrid cloud or may represent an edge server located at the edge of a given network to facilitate performance of certain processing physically closer to one or more systems or applications that are creating the data being stored on and/or used by the edge server.

In some implementations, although host system 100 is depicted as implementing a virtualization system to virtualize its resources (e.g., memory resources and processing resources), some implementations may execute applications and/or workload on host system 100 by directly utilizing the resources of host system 100, without implementation of a virtualization system.

Depending upon the particular implementation, the VMM 140 may be a bare metal hypervisor (e.g., Kernel-based Virtual Machine (KVM), ACRN, VMware ESXi, Citrix XenServer, or Microsoft Hyper-V hypervisor) or may be a hosted hypervisor. The VMM 140 is responsible for allowing the host system 100 to support multiple VMs (e.g., 120*a-n*, collectively referred to herein a VMs 120) by virtually sharing its resources (e.g., memory resources and processing resources) for use by the VMs.

Each of the VMs 120 may run a guest operating system (OS) (e.g., Linux or Windows) as well as a driver (e.g., 137*a-n*) for interfacing with accelerators (e.g., accelerators 170*a-x*) compatible with one or more input/output (I/O) bus technologies (e.g., Accelerated Graphics Port (AGP), Peripheral Component Interconnect (PCI), PCI eXtended (PCI-X), PCI Express, Compute Express Link (CXL), or the like).

In the context of the example herein, a host operating system (OS) 150 is logically interposed between the VMM 140 and a host interface 160 (e.g., a serial or parallel expansion bus implementing one or more I/O bus technologies) and may be responsible for dynamically routing workloads (e.g., workloads 135*a-n*) of the VMs 120 to one or more hardware accelerators (e.g., accelerators 170*a-y*, collectively referred to herein as accelerators 170) coupled to the host system 100 via the host interface 160. The host OS 150 may include a data parallel programming compiler 152 and a data parallel programming runtime 154 to enable data parallel programming-based transparent transfer across heterogeneous devices. A non-limiting example of various functional units that might make up the data parallel programming compiler 152 and a data parallel programming runtime 154 is described below with reference to FIG. 2.

In some implementations, host system 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable. In some implementations, the accelerators 170 may be communicably coupled to host system 100 via the network interface device(s).

The accelerators 170 may represent one or more types of hardware accelerators (e.g., XPUs) to which various tasks (e.g., workloads 135*a-n*) may be offloaded from the CPU 100. For example, workloads 135*a-n* may include large AI and/or ML tasks that may be more efficiently performed by a graphics processing unit (GPU) than the CPU 100. In one embodiment, rather than being manufactured on a single piece of silicon, one or more of the accelerators may be made up of smaller integrated circuit (IC) blocks (e.g., tile(s) 175*a* and tiles(s) 175*m*), for example, that represent reusable IP blocks that are specifically designed to work with other similar IC blocks to form larger more complex chips (e.g., accelerators 170*a-y*). In some implementations, an accelerator 170 may include, but is not limited to, a GPU, a specialized CPU, or a programmable logic device including, but not limited to, an FPGA, ASIC, a re-purposed CPU, or a re-purposed GPU, for example.

In various examples described herein, slices of physical resources (not shown) of individual accelerators (e.g., at the tile level and/or at the accelerator level) may be predefined (e.g., via a configuration file associated with the particular accelerator) and exposed as Virtual Functions (VFs) (e.g., VFs 180*a-x*, collectively referred to herein as VFs 180). As described further below, data parallel programming-based transparent transfer across heterogeneous devices may be performed by the data parallel programming runtime 154 based on compiled telemetry data of an executing instance(s) of an application program compiled by a data parallel programming compiler 152, as discussed further below with respect to FIGS. 2-6.

Embodiments may be provided, for example, as a computer program product which may include one or more machine—readable media having stored thereon machine executable instructions that, when executed by one or more machines such as a computer, network of computers, or other electronic devices, may result in the one or more machines carrying out operations in accordance with embodiments described herein. A machine—readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine—readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
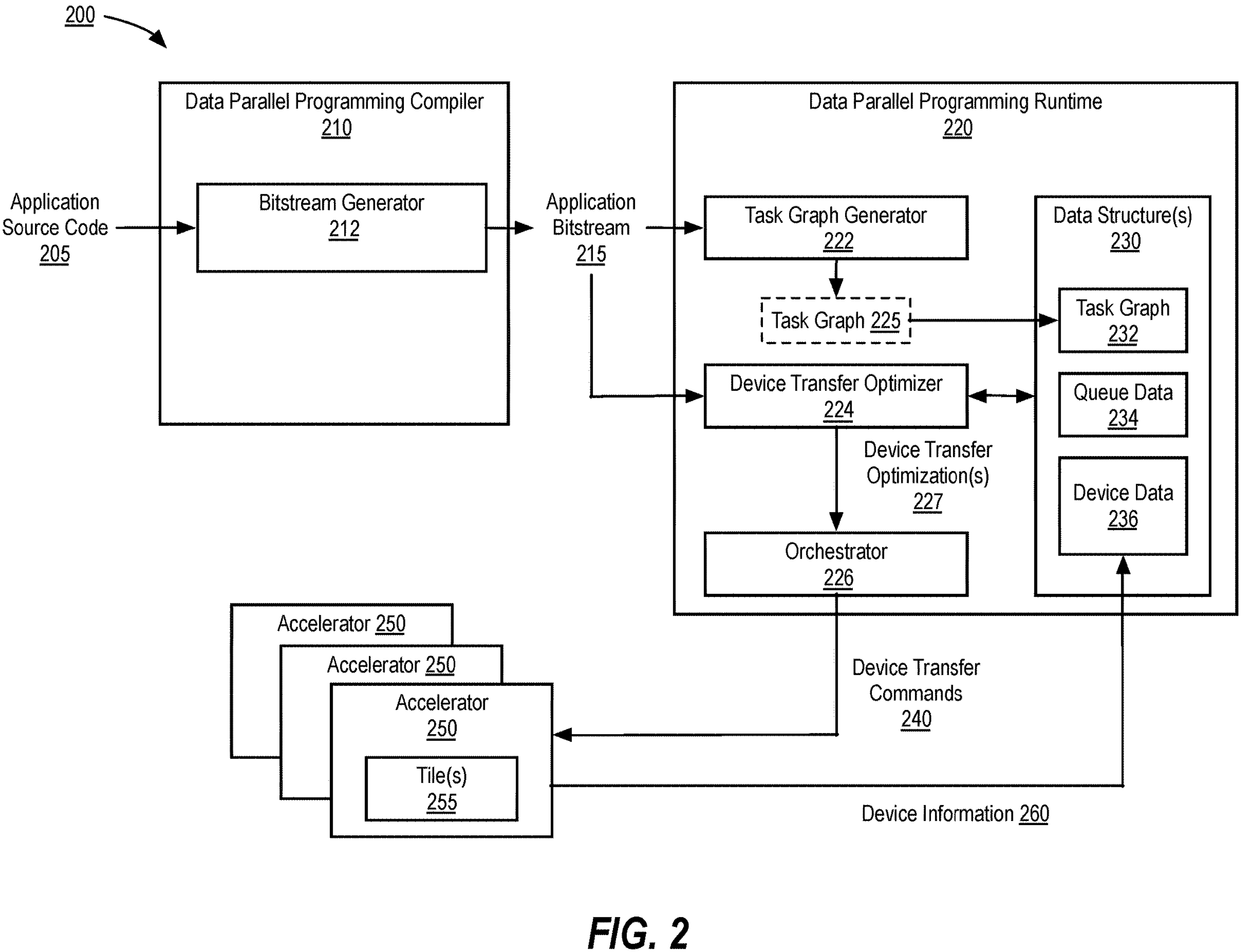
FIG. 2 illustrates a data parallel programming computing environment including a data parallel programming compiler and a data parallel programming runtime to implement data parallel programming-based transparent transfer across heterogeneous devices, in accordance with implementation herein.

FIG. 2 illustrates a data parallel programming computing environment 200 including a data parallel programming compiler 210 and a data parallel programming runtime 220 to implement data parallel programming-based transparent transfer across heterogeneous devices, in accordance with implementation herein. In one implementation, data parallel programming compiler 210 is the same as data parallel programming compiler 152 of FIG. 1 and data parallel programming runtime 220 is the same as data parallel programming runtime 154 of FIG. 1. In one implementation, computing environment 200 may be part of host system 100 of FIG. 1. For example, data parallel programming compiler 210 and a data parallel programming runtime 220 may be hosted by CPU 110 described with respect to FIG. 1. Furthermore, data parallel programming compiler 210 and a data parallel programming runtime 220 may be communicably coupled to one or more accelerators 250, which may be the same as accelerator 170 of FIG. 1 in implementations herein. For brevity, many of the details already discussed with reference to FIG. 1 are not repeated or discussed hereafter.

With respect to FIG. 2, in one implementation, the data parallel programming compiler 210 (also referred to herein as compiler 210) may include, but is not limited to, a bitstream generator 212. The data parallel programming runtime 220 (also referred to herein as runtime 220) may include, but is not limited to, a task graph generator 222, a device transfer optimizer 224, an orchestrator 226, and data structure(s) 230. In implementations herein, the compiler 210 and/or the runtime 220, as well as their sub-components, may be implemented by hardware, software, firmware and/or any combination of hardware, software and/or firmware. Accelerator(s) 250 may include one or more tile(s) 255 (which can be the same as tiles 175 of FIG. 1). In one implementation tile(s) 255 may refer to regions of an FPGA accelerator device that can be configured via PR.

As previously described, a data parallel programming model, such as the one depicting in data parallel programming computing environment 200, is a queue-based heterogeneous accelerator programming model that creates a queue which is tied to a specific accelerator or specific type/class of accelerator. In conventional data parallel programming models, when a device is removed or de-provisioned from a system for any one of a variety of reasons, such as hardware resource rebalancing or prediction of imminent failure, submissions to the queue fail. Queue failures can lead to abnormal program termination unless an application is explicitly developed to handle such errors. Both abnormal termination and structuring of a program to gracefully handle such errors is expensive and degrades the usefulness of data parallel programming models in various deployments.

Implementations of the disclosure provide for data parallel programming-based transparent transfer across heterogeneous devices. Implementations herein provide for a data parallel programming runtime that can transparently switch to another compatible device underlying a queue when there is a notification of de-provisioning from a system management framework. In implementations herein, an alternate device can become active without user intervention such that workloads continue to execute, even though the queue was originally bound to a different device and even though the user had no way to rebind the queue manually.

A further extension of implementations herein includes enabling automatic migration to a more-efficient device when one becomes available, either because the more-efficient device was newly provisioned into the system at runtime, or because the more-efficient device has become less loaded with other computational work. The data parallel programming model operates to provide explicit user control over the binding between a queue and specific device. However, implementations of the disclosure can treat that binding as a logical binding and perform automatic migration for efficiency.

In one implementation, the compiler 210 may receive application source code 205 for purposes of compilation. In one implementation the compiler 210 is a JIT compiler. The bitstream generator 212 may receive the application source code 205 and generate one or more application bitstreams 215 to provide to data parallel programming runtime 220. In implementations herein, the application bitstream 215 is compiled for portions of the application source code 205, such as for each kernel of the application source code 205. A kernel may refer to a unit of computation in the data parallel programming model. A kernel may be as small as a single line of code or can encompass many lines of code (e.g., thousands of lines of code, etc.).

The runtime 220 can utilize the task graph generator 222 to create a task graph 225 based on the application bitstream 215 generated by compiler 210. The task graph 225 is a representation of the relationships and dependencies existing in the application source code 205 as represented by the application bitstream 215. As such, the task graph 225 can provide information on how quickly kernels should complete based on downstream data and control dependencies. In one implementation, the task graph 225 may be stored in an internal data structure 230 of the runtime 220 as task graph 232.

Implementations data parallel programming-based transparent transfer across heterogeneous devices. The device transfer optimizer 224 may utilize the task graph 225 (stored as task graph 232 in data structure 230) as well as queue data 234 and device data 236 stored in data structure 230 as input for device transfer optimizations 227.

In implementations herein, device transfer optimizations 227 may include a selection of a new device, such as accelerator(s) 250, to associate with a queue of the application program in the data parallel programming computing environment 200. A "queue", as discussed herein, may refer to a data structure, such as a first-in first-out (FIFO) buffer, used to connect a host application program to a single device. The host application program can submit tasks to the device via the queue and may monitor the queue for completion. An application program initiates a task by submitting a command group function object to the queue. As previously noted, an application program may be divided into kernels. In the case of kernels, the command group defines a kernel function, the prerequisites to execute the kernel function, and an invocation of the kernel function on an index space. The queue may be used to store arguments for multiple invocations of the kernel on the device. For example, in one implementation, once the kernel finishes execution, the queue can allow the next invocation of the kernel to start immediately after. However, in some implementations, a kernel can have multiple instances from a queue running at the same time and data or control dependencies/prerequisites can determine whether one instance should wait for a previous one to complete. After submitting the command group, the application program may use the queue to monitor the completion of the task for completion and/or errors.

In some implementations, the accelerator(s) 250 can provide device information 260 to the runtime 220. This device information 260 may include the device type, make and model of the device, capabilities of the device (e.g., features, attributes), current device telemetry metrics (such as power consumption, load, resource utilization, memory utilization, network bandwidth, network throughput, network latency, etc.), occurrence of errors, occurrence of faults, and so on. The device information 260 may be provided as events during normal operation of the accelerator(s) 250 (e.g., initialization, runtime, etc.). The device information 260 may also be polled from the accelerator(s) 250 by the runtime 220 in some implementations.

The device information 260 can be stored as device data 236 in data structure(s) 230 and be used as part of the device transfer optimization formulation performed by device transfer optimizer 224 in implementations herein to seamless transfer queues between devices and improve application program operation and efficiency.

The runtime 220 can utilize the device transfer optimizer 224 to transparently switch to another compatible device (e.g., accelerator(s) 250) underlying a queue in response to a change in a status of the original device and/or of the new device. A change in status may include a notification of de-provisioning of the original device from a system management framework, a failure of the original device, and/or a change in performance of the new device (e.g., less load, etc.). As shown in FIG. 2, the device transfer is facilitated by the runtime 220 itself. However, in some implementations, the device transfer can be facilitated by the underlying device user-mode driver (UMD), or by the underlying device kernel-mode driver (KMD), depending on the similarities of the devices and driver capabilities.

Figure 3:
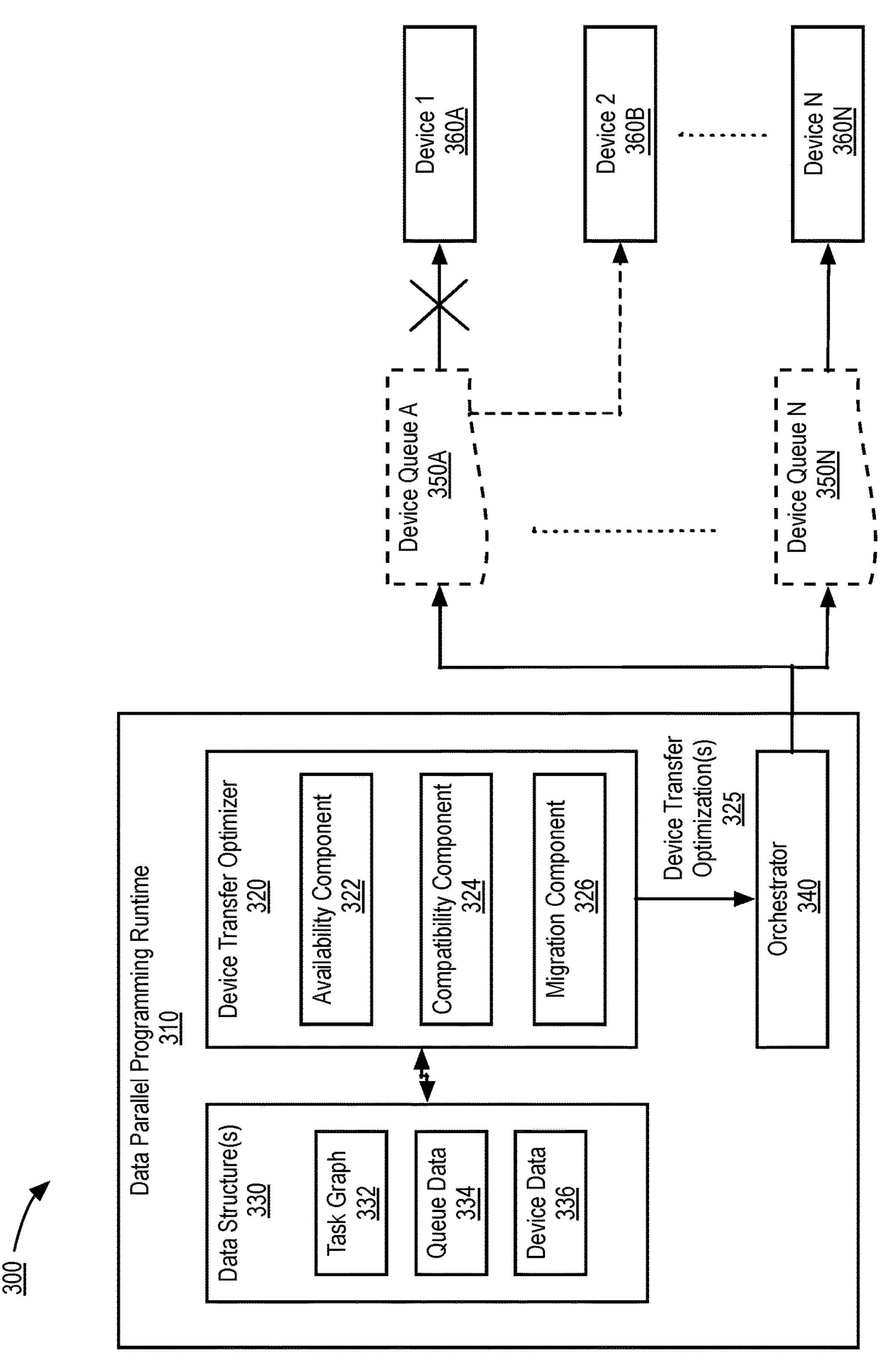
FIG. 3 is a block diagram illustrating a data parallel programming runtime environment to implement data parallel programming-based transparent transfer across heterogeneous devices, in accordance with implementations herein.

FIG. 3 is a block diagram illustrating a data parallel programming runtime environment 300 to implement data parallel programming-based transparent transfer across heterogeneous devices, in accordance with implementations herein. Environment 300 includes a data parallel programming runtime 310 (referred to herein as runtime 310) communicably coupled to a plurality of devices 360A-360N. In one implementation, runtime 310 may be the same as runtime 220 described with respect to FIG. 2. In one implementation, devices 360A-360N (collectively referred to herein as devices 360) may include a plurality of hardware computing devices, such as device 1 360A, device 2 360B, through device N 360N. In one implementation, devices 360 may be the same as accelerators 250 of FIG. 2. Data structure 330 may be the same as data structure 230 described with respect to FIG. 2, and may store a task graph 332, queue data 334, and/or device data 336, which may all be the same as their identically-named counterparts of FIG. 2.

In implementations herein, runtime 310 receives compiled code for an application program and executes the compiled code. The application program may create queues for the commands of the application, where the queues for the application can include device queue A 350A through device queue N 350N (collectively referred to herein as queues 350). The application program can submit tasks to the devices 360 via the queues 350 and may monitor the queues 350 for completion. An application program initiates a task by submitting a command group function object to the queue. In some implementations, there can be a 1:1 association between a queue 350 and a device 360, such that device queue A 350A is associated with device 1 360A and device queue N 350N is associated with device N 360N.

The runtime 310 may include a device transfer optimizer 320, data structure(s) 330, and an orchestrator 340, which may all be the same as their identically-named components described with respect to FIG. 2. In one implementation, the device transfer optimizer 320 transparently switch from an original device 360 to a new compatible device 360 underlying a queue in response to a change in a status of the original device 360 and/or of the new device 360. The device transfer optimizer 320 may include an availability component 322, a compatibility component 324, and a migration component 326 to enable the transfer device transfer process of implementations herein. In implementations herein, the runtime 310, as well as its sub-components, such as the availability component 322, the compatibility component 324, and the migration component 326, may be implemented by hardware, software, firmware and/or any combination of hardware, software and/or firmware.

In implementations herein, the availability component 322 may receive a notification and/or make a determine of a change in device status that warrants a device transfer. For example, availability component 322 may analyze device data 336 to identify that a device status has changed. For purposes of the following discussion, an example case is provided where availability component 322 determines that device 1 360A is being removed from the runtime environment 300. As previously noted, a change in status may include a notification of de-provisioning of the original device from a system management framework, a notification of removal of the original device from a system management framework, a failure of the original device, and/or a change in performance of the new device (e.g., less load, etc.).

In some implementations herein, the transparent device transfer discussed herein can also be implemented to enable automatic migration to a more-efficient device 360 when one becomes available, either because the more-efficient device 360 is newly provisioned into the runtime environment 300 at runtime, or because the more-efficient device 360 has become less loaded with other computational work. Both performance and performance per power can be used as drivers of such an optimization calculation used to estimate when there would be a benefit from migration to a more capable device.

In response to identification of the change in device status of device 1 360A (e.g., as determined from a notification and/or from analysis of device data 336) by the availability component 322, the compatibility component 324 can determine whether another device 360 exists in the runtime environment 300 that is compatible with the device 1 360A. In one implementation, the compatibility component 324 may identify a compatible device based on analysis of resource intersection of device capabilities (aspects), compatible context when some device resources such as unified shared memory utilize context stability, and/or architecture class. The compatibility component 324 may access and analyze device data 336 to identify the resource intersection, where the device data can store information of the devices 360. The device information can include device type, make and model of the device, capabilities of the device (e.g., features, attributes), current device telemetry metrics (such as power consumption, load, resource utilization, memory utilization, network bandwidth, network throughput, network latency, etc.), occurrence of errors, occurrence of faults, and so on. In some implementations, compatibility component 324 may also take into account the task graph 332 as part of its compatibility determination.

The compatibility component 324 can perform a comparison between device 1 360A and the other available devices, such as device 2 360B through device N 360N to identify a most compatible device that also satisfies a compatibility threshold for device transfer. In one implementation, the compatibility threshold may be established by an administrator of the runtime environment 300 and/or by a developer of the application program, for example. The selected compatible device can be a device 360 of the same make and model (a homogeneous transfer) as the original device 1 360A, or can be a different but otherwise compatible device 360 (a heterogeneous transfer, say from a discrete GPU to an integrated GPU).

In some implementations, one of the devices 360 may be an FPGA accelerator device, which can be dynamically reconfigured to emulate other device types. For example, an FPGA can be reconfigured as a soft Instruction Set Architecture (ISA) processor or can be reconfigured to emulate a GPU. As such, the FPGA can be selected and utilized in implementations herein as a compatible device for other device types.

For purposes of continuing with the above-discussed example, it is assumed that compatibility component 324 selects device 2 360B as a compatible device to device 1 360A. Compatibility component 324 then may notify the migration component 326 that a device transfer is to be made from device 1 360A to device 2 360B. The migration component 326 can be cause a device transfer optimization 325 to be passed to the orchestrator 340 to cause a migration of the state of device 1 360A to device 2 360B in a seamless manner. When swapping to a new device underlying a queue, the orchestrator 340 should cause the copying of at least one of a state or data from the old (original) device, device 1 360A, to the new device, device 2 360B, and cause subsequent kernels to be launched on the new device. The orchestrator 340 also causes queue requests for device queue A 350A to be emulated and diverted to the new device, device 2 360B. For example, Intel® XuCode can be utilized to emulate and divert the queue requests. In some implementations, use of unified shared memory can reduce the overhead of the migration process, and can enable finer-grained migration of work across devices 360.

The migration for the device transfer allows an alternate device, such as device 2 360B, to become active without user intervention, such that workloads of the application program continue to execute, even though the device queue A 350A was originally bound to a device 1 360A and even though the user has no way to rebind the device queue A 350A manually. The data parallel programming model provides explicit user control over the binding between a queue and specific device, but treating that binding as logical and performing automatic migration for efficiency can enable the implementations discussed herein.

Referring back to FIG. 2, the device transfer optimizer 224 may update queue data 234, stored in data structure(s) 230, with an updating logical mapping between the queue and the newly-selected device (e.g., accelerator 250) to associate with the queue. In one implementations, the queue data 234 may include a logical mapping of queues to devices such that the binding between queues and devices can be considered logical and enable the seamless device transfer in the queue-based data parallel programming environment discussed herein.

In one implementation, the device transfer optimizer 224 provides the device transfer optimizations 227 to orchestrator 226. In some implementations, orchestrator 226 may also be referred to as a scheduler. The orchestrator 226 can provide device transfer commands 240 to accelerator(s) 250 to enable the accelerator(s) 250 to implement the device transfer optimizations 227. The device transfer commands 240 may include kernel invocation commands and/or data movement commands that can be submitted to hardware interface queues of the accelerator(s) 250 to enable the accelerators(s) 250 to being operations on queue(s) of the application program.

As previously noted, conventional approaches for existing failover techniques are not exposed to data parallel programming (e.g., DPC++) queue-based programming. Implementations herein expose this data parallel programming queue-based programming capability for improved FPGA design abstraction code (e.g., register-transfer-level (RTL) code) design, as well as scheduling and reconfigurability with data parallel programming management in terms of regeneration of kernels and routing.

In addition to handling failure of a device, implementations herein can also assist in terms of augmentation of existing devices (e.g., reconfiguration of FPGA) or addition of new devices via hot-swap to seamlessly route a workload. Implementations herein provide a capability to have revocation management with rerouting based on policy configurations. Implementations discussed herein can also work without or without a trusted execution environment (TEE) to be resilient against any malicious rerouting based on the policy configurations.

Figure 4:
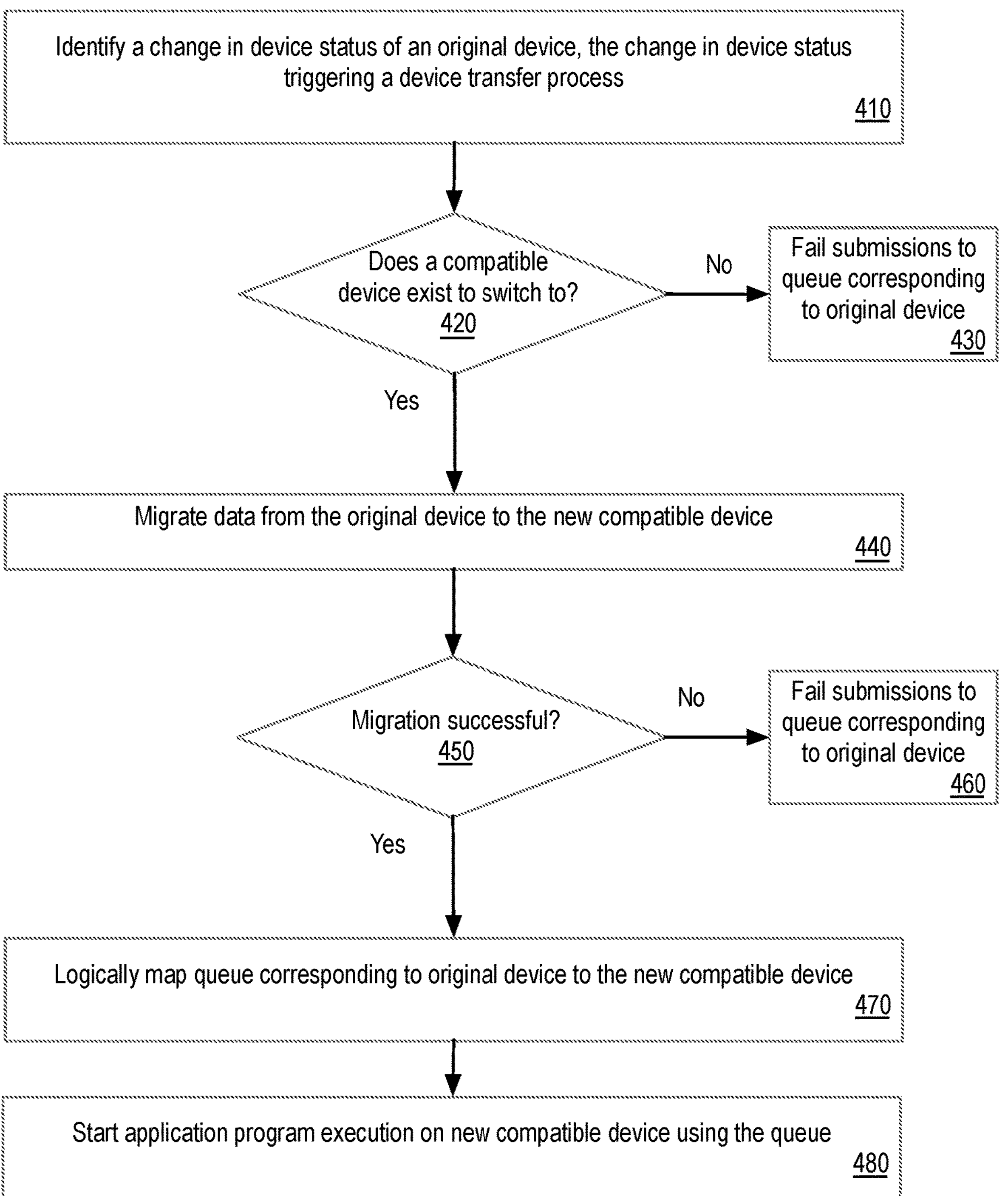
FIG. 4 is a flow diagram illustrating a method for data parallel programming-based transparent transfer across heterogeneous devices in response to device removal, in accordance with implementations of the disclosure.

FIG. 4 is a flow diagram illustrating a method 400 for data parallel programming-based transparent transfer across heterogeneous devices in response to device removal, in accordance with implementations of the disclosure. Method 400 may be performed by processing logic that may comprise hardware (e.g., circuitry, dedicated logic, programmable logic, etc.), software (such as instructions run on a processing device), or a combination thereof. More particularly, the method 400 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 400 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter. In one implementation, a processor implementing a runtime, such as a processor 110 implementing data paralleling programming runtime 154 or data parallel programming runtime 220 described with respect to FIGS. 1-2, may perform method 400.

Method 400 begins at block 410 where the processor may identify a change in device status of an original device. In one implementation, the change in device status triggers a device transfer process. Then, at decision block 420, the processor may determine whether a compatible device exists to switch to. If not, the method 400 proceeds to block 430 where the processor may fail submissions to queue corresponding to original device.

On the other hand, if a compatible device does exist at decision block 420, method 400 proceeds to block 440 where the processor may migrate data from the original device to the new compatible device. At decision block 450, the processor may determine whether the migration was successful. If not, method 400 proceeds to block 460 where the processor may fail submissions to queue corresponding to original device.

On the other hand, if the migration is successful at decision block 450, the method 400 proceeds to block 470 where the processor may logically map a queue corresponding to the original device to the new compatible device. Subsequently, at block 480, the processor may start application program execution on the new compatible device using the queue.

Figure 5:
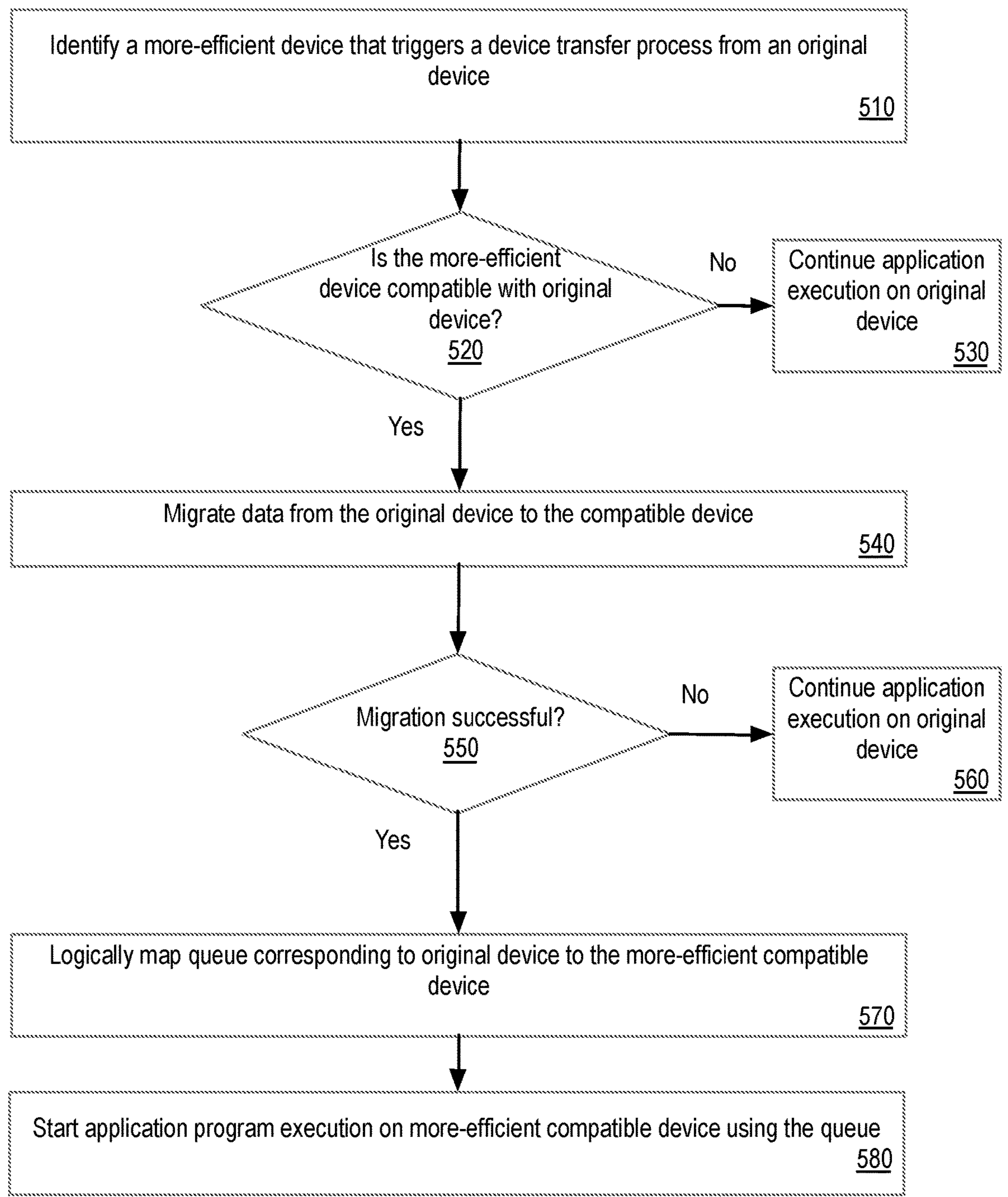
FIG. 5 is a flow diagram illustrating a method for data parallel programming-based transparent transfer across heterogeneous devices for device efficiency, in accordance with implementations of the disclosure.

FIG. 5 is a flow diagram illustrating a method 500 for data parallel programming-based transparent transfer across heterogeneous devices for device efficiency, in accordance with implementations of the disclosure. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a processor implementing a runtime, such as a processor 110 implementing data paralleling programming runtime 154 or data parallel programming runtime 220 described with respect to FIGS. 1-2, may perform method 500.

Method 500 begins at block 510 where the processor may identify a more-efficient device that triggers a device transfer process from an original device. Then, at decision block 520, the processor may determine whether the more-efficient device is compatible with the original device. If not, the method 500 proceeds to block 530 where the processor may continue application execution on original device.

On the other hand, if a compatible device does exist at decision block 520, method 500 proceeds to block 540 where the processor may migrate data from the original device to the new compatible device. At decision block 550, the processor may determine whether the migration was successful. If not, method 500 proceeds to block 560 where the processor may continue application execution on original device.

On the other hand, if the migration is successful at decision block 550, the method 500 proceeds to block 570 where the processor may logically map a queue corresponding to the original device to the more-efficient compatible device. Subsequently, at block 580, the processor may start application program execution on the more-efficient compatible device using the queue.

Figure 6:
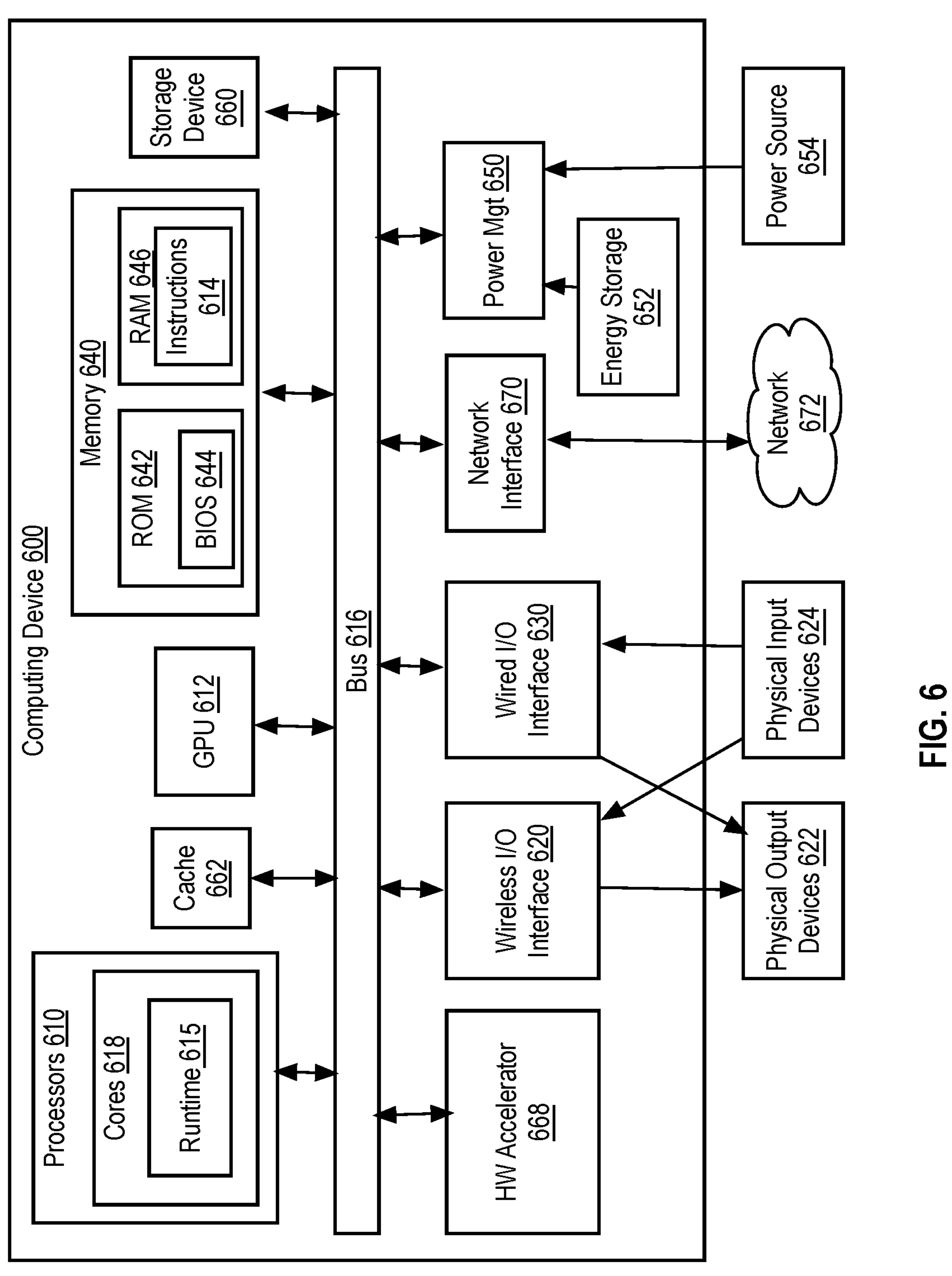
FIG. 6 is a schematic diagram of an illustrative electronic computing device to enable data parallel programming-based transparent transfer across heterogeneous devices, according to some embodiments.

FIG. 6 is a schematic diagram of an illustrative electronic computing device 600 to enable data parallel programming-based transparent transfer across heterogeneous devices, according to some embodiments. In some embodiments, the computing device 600 includes one or more processors 610 including one or more processors cores 618 including a runtime 615, such as a data parallel programming runtime 154, 220 described with respect to FIGS. 1 and 2, respectively. In some embodiments, the computing device is to provide data parallel programming-based transparent transfer across heterogeneous devices, as provided in FIGS. 1-6.

The computing device 600 may additionally include one or more of the following: cache 662, a graphical processing unit (GPU) 612 (which may be the hardware accelerator in some implementations), a wireless input/output (I/O) interface 620, a wired I/O interface 630, system memory 640 (e.g., memory circuitry), power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks are not described in further detail herein, as they can be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 694 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate data parallel programming-based transparent transfer across heterogeneous devices. The apparatus of Example 1 comprises a processor to: identify a change in device status that triggers a device transfer process from an original device, wherein the original device is associated with a queue of an application program of a data parallel programming runtime; identify a new device that is compatible with the original device; migrate at least one of a state or data of the original device to the new device; logically map, without user intervention, the queue to the new device in the data parallel programming runtime; and initiate execution of the application program on the new device using the queue.

In Example 2, the subject matter of Example 1 can optionally include wherein the change in the device status comprises a change in device status of the original device. In Example 3, the subject matter of any one of Examples 1-2 can optionally include wherein the change in the device status of the original device comprises at least one of de-provisioning of the original device from a computing environment of the data parallel programming runtime or removal of the original device from the computing environment. In Example 4, the subject matter of any one of Examples 1-3 can optionally include wherein the change in device status comprises a change in device status of the new device.

In Example 5, the subject matter of any one of Examples 1~4 can optionally include wherein the change in the device status of the new device comprises at least one of adding the new device to a computing environment of the data parallel programming runtime, higher performance of the new device as compared to the original device, or higher performance per power of the new device as compared to the original device. In Example 6, the subject matter of any one of Examples 1-5 can optionally include wherein the processor to identify that the new device is compatible with the original device is based on analysis of resource intersections of at least one of: device capabilities of the original device and the new device, compatible context between the original device and the new device, or architecture class of the original device the new device.

In Example 7, the subject matter of any one of Examples 1-6 can optionally include wherein the device capabilities comprise at least one of device type, device make, device model, device features, device attributes, or device telemetry metrics. In Example 8, the subject matter of any one of Examples 1-7 can optionally include wherein the device telemetry metrics comprise at least one of power consumption, load, resource utilization, memory utilization, network bandwidth, network throughput, or network latency.

In Example 9, the subject matter of any one of Examples 1-8 can optionally include wherein at least one of the original device or the new device comprises at least one a graphic processing unit (GPU), a central processing unit (CPU), or a programmable integrated circuit (IC). In Example 10, the subject matter of any one of Examples 1-9 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 11 is a method for facilitating data parallel programming-based transparent transfer across heterogeneous devices. The method of Example 11 can include identifying, by a processing device of a data parallel programming runtime, a change in device status that triggers a device transfer process from an original device, wherein the original device is associated with a queue of an application program of the data parallel programming runtime; identifying, by the processing device, a new device that is compatible with the original device; migrating at least one of a state or data of the original device to the new device; logically mapping, by the processing device without user intervention, the queue to the new device in the data parallel programming runtime; and initiating execution of the application program on the new device using the queue.

In Example 12, the subject matter of Example 11 can optionally include wherein the change in the device status comprises a change in device status of the original device, and wherein the change in the device status of the original device comprises at least one of de-provisioning of the original device from a computing environment of the data parallel programming runtime or removal of the original device from the computing environment. In Example 13, the subject matter of Examples 11-12 can optionally include wherein the change in device status comprises a change in device status of the new device, and wherein the change in the device status of the new device comprises at least one of adding the new device to a computing environment of the data parallel programming runtime, higher performance of the new device as compared to the original device, or higher performance per power of the new device as compared to the original device.

In Example 14, the subject matter of Examples 11-13 can optionally include further comprising identifying that the new device is compatible with the original device is based on analysis of resource intersections of at least one of: device capabilities of the original device and the new device, compatible context between the original device and the new device, or architecture class of the original device the new device. In Example 15, the subject matter of Examples 11-14 can optionally include wherein the device capabilities comprise at least one of device type, device make, device model, device features, device attributes, or device telemetry metrics, and wherein the device telemetry metrics comprise at least one of power consumption, load, resource utilization, memory utilization, network bandwidth, network throughput, or network latency.

Example 16 is a non-transitory computer-readable storage medium for facilitating data parallel programming-based transparent transfer across heterogeneous devices. The non-transitory computer-readable storage medium of Example 16 having stored thereon executable computer program instructions that, when executed by one or more processors, cause the one or more processors to perform operations comprising: identify, by the at least one processor of a data parallel programming runtime, a change in device status that triggers a device transfer process from an original device, wherein the original device is associated with a queue of an application program of the data parallel programming runtime; identify, by the at least one processor, a new device that is compatible with the original device; migrating at least one of a state or data of the original device to the new device; logically mapping, by the at least one processor without user intervention, the queue to the new device in the data parallel programming runtime; and initiating execution of the application program on the new device using the queue.

In Example 17, the subject matter of Example 16 can optionally include wherein the change in the device status comprises a change in device status of the original device, and wherein the change in the device status of the original device comprises at least one of de-provisioning of the original device from a computing environment of the data parallel programming runtime or removal of the original device from the computing environment. In Example 18, the subject matter of Examples 16-17 can optionally include wherein the change in device status comprises a change in device status of the new device, and wherein the change in the device status of the new device comprises at least one of adding the new device to a computing environment of the data parallel programming runtime, higher performance of the new device as compared to the original device, or higher performance per power of the new device as compared to the original device.

In Example 19, the subject matter of Examples 16-18 can optionally include wherein the instructions to cause the at least one processor to further identify that the new device is compatible with the original device is based on analysis of resource intersections of at least one of: device capabilities of the original device and the new device, compatible context between the original device and the new device, or architecture class of the original device the new device. In Example 20, the subject matter of Examples 16-19 can optionally include wherein the device capabilities comprise at least one of device type, device make, device model, device features, device attributes, or device telemetry metrics, and wherein the device telemetry metrics comprise at least one of power consumption, load, resource utilization, memory utilization, network bandwidth, network throughput, or network latency.

Example 21 is a system for facilitating data parallel programming-based transparent transfer across heterogeneous devices. The system of Example 21 can optionally include a memory to store a block of data, and a processor communicably coupled to the memory to: identify a change in device status that triggers a device transfer process from an original device, wherein the original device is associated with a queue of an application program of a data parallel programming runtime; identify a new device that is compatible with the original device; migrate at least one of a state or data of the original device to the new device; logically map, without user intervention, the queue to the new device in the data parallel programming runtime; and initiate execution of the application program on the new device using the queue.

In Example 22, the subject matter of Example 21 can optionally include wherein the change in the device status comprises a change in device status of the original device. In Example 23, the subject matter of any one of Examples 21-22 can optionally include wherein the change in the device status of the original device comprises at least one of de-provisioning of the original device from a computing environment of the data parallel programming runtime or removal of the original device from the computing environment. In Example 24, the subject matter of any one of Examples 21-23 can optionally include wherein the change in device status comprises a change in device status of the new device.

In Example 25, the subject matter of any one of Examples 21-24 can optionally include wherein the change in the device status of the new device comprises at least one of adding the new device to a computing environment of the data parallel programming runtime, higher performance of the new device as compared to the original device, or higher performance per power of the new device as compared to the original device. In Example 26, the subject matter of any one of Examples 21-25 can optionally include wherein the processor to identify that the new device is compatible with the original device is based on analysis of resource intersections of at least one of: device capabilities of the original device and the new device, compatible context between the original device and the new device, or architecture class of the original device the new device.

In Example 27, the subject matter of any one of Examples 21-26 can optionally include wherein the device capabilities comprise at least one of device type, device make, device model, device features, device attributes, or device telemetry metrics. In Example 28, the subject matter of any one of Examples 21-27 can optionally include wherein the device telemetry metrics comprise at least one of power consumption, load, resource utilization, memory utilization, network bandwidth, network throughput, or network latency.

In Example 29, the subject matter of any one of Examples 21-28 can optionally include wherein at least one of the original device or the new device comprises at least one a graphic processing unit (GPU), a central processing unit (CPU), or a programmable integrated circuit (IC). In Example 30, the subject matter of any one of Examples 21-29 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 31 is an apparatus for facilitating data parallel programming-based transparent transfer across heterogeneous devices, comprising means for identifying, via a processing device of a data parallel programming runtime, a change in device status that triggers a device transfer process from an original device, wherein the original device is associated with a queue of an application program of the data parallel programming runtime; means for identifying a new device that is compatible with the original device; migrating at least one of a state or data of the original device to the new device; means for logically mapping, without user intervention, the queue to the new device in the data parallel programming runtime; and means for initiating execution of the application program on the new device using the queue. In Example 32, the subject matter of Example 31 can optionally include the apparatus further configured to perform the method of any one of the Examples 12 to 15.

Example 33 is at least one machine readable medium comprising a plurality of instructions that in response to being executed on a computing device, cause the computing device to carry out a method according to any one of Examples 11-15. Example 34 is an apparatus for facilitating data parallel programming-based transparent transfer across heterogeneous devices, configured to perform the method of any one of Examples 11-15. Example 35 is an apparatus for facilitating data parallel programming-based transparent transfer across heterogeneous devices, comprising means for performing the method of any one of Examples 11 to 15. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:

a hardware processing device communicably coupled to a plurality of heterogeneous hardware accelerator devices, the hardware processing device to execute a data parallel programming runtime that is to manage programming of the plurality of heterogeneous hardware accelerator devices and is further to:

identify a change in device status that triggers a device transfer process from a first hardware device of the plurality of heterogeneous hardware accelerator devices, wherein the first hardware device is associated with a queue of an application program of the data parallel programming runtime, the queue used to connect the application program to the first hardware device;

analyze resource intersections between the first hardware device and a second hardware device of the plurality of heterogeneous hardware accelerator devices, wherein the resource intersections comprise at least resource intersections between device capabilities of the first hardware device and the second hardware device, and wherein the device capabilities comprise at least one of features or attributes of the first hardware device or the second hardware device;

determine that the second hardware device is compatible with the first hardware device based on the resource intersections analyzed between the second hardware device and the first hardware device;

migrate at least one of a state or data of the first hardware device to the second hardware device;

logically map, without user intervention, the queue to the second hardware device in the data parallel programming runtime, and cause queue requests for the queue to be emulated and diverted to the second hardware device; and initiate execution of the application program on the second hardware device using the queue.

2. The apparatus of claim 1, wherein the change in the device status comprises a change in device status of the first hardware device.

3. The apparatus of claim 2, wherein the change in the device status of the first hardware device comprises at least one of de-provisioning of the first hardware device from a computing environment of the data parallel programming runtime or removal of the first hardware device from the computing environment.

4. The apparatus of claim 1, wherein the change in the device status comprises a change in device status of the second hardware device.

5. The apparatus of claim 4, wherein the change in the device status of the second hardware device comprises at least one of adding the second hardware device to a computing environment of the data parallel programming runtime, higher performance of the second hardware device as compared to the first hardware device, or higher performance per power of the second hardware device as compared to the first hardware device.

6. The apparatus of claim 1, wherein the hardware processing device to analyze the resource intersections further comprises analyzing the resource intersections of at least one of: the device capabilities of the first hardware device and the second hardware device, compatible context between the first hardware device and the second hardware device, or architecture class of the first hardware device the second hardware device.

7. The apparatus of claim 6, wherein the at least one of the features or the attributes comprise at least one of device type, device make, device model, device features, device attributes, or device telemetry metrics.

8. The apparatus of claim 7, wherein the device telemetry metrics comprise at least one of power consumption, load, resource utilization, memory utilization, network bandwidth, network throughput, or network latency.

9. The apparatus of claim 1, wherein the plurality of heterogeneous hardware accelerator devices comprise at least one a graphic processing unit (GPU), a central processing unit (CPU), or a programmable integrated circuit (IC).

10. The apparatus of claim 9, wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EE-PLD), a logic cell array (LCA), or a complex programmable logic devices (CPLD).

11. A method comprising:

executing, by a hardware processing device communicably coupled to a plurality of heterogeneous hardware accelerator devices, a data parallel programming runtime that is to manage programming of the plurality of heterogeneous hardware accelerator devices;

identifying, by the hardware processing device via the data parallel programming runtime, a change in device status that triggers a device transfer process from a first hardware device of the plurality of heterogeneous hardware accelerator devices, wherein the first hardware device is associated with a queue of an application program of the data parallel programming runtime, the queue used to connect the application program to the first hardware device;

analyzing, by the hardware processing device, resource intersections between the first hardware device and a second hardware device of the plurality of heterogeneous hardware accelerator devices, wherein the resource intersections comprise at least resource intersections between device capabilities of the first hardware device and the second hardware device, and wherein the device capabilities comprise at least one of features or attributes of the first hardware device or the second hardware device;

determining, by the hardware processing device via the data parallel programming runtime, that the second hardware device is compatible with the first hardware device based on the resource intersections analyzed between the second hardware device and the first hardware device;

migrating at least one of a state or data of the first hardware device to the second hardware device;

logically mapping, by the hardware processing device via the data parallel programming runtime without user intervention, the queue to the second hardware device in the data parallel programming runtime, and causing queue requests for the queue to be emulated and diverted to the second hardware device; and initiating execution of the application program on the second hardware device using the queue.

12. The method of claim 11, wherein the change in the device status comprises a change in device status of the first hardware device, and wherein the change in the device status of the first hardware device comprises at least one of de-provisioning of the first hardware device from a computing environment of the data parallel programming runtime or removal of the first hardware device from the computing environment.

13. The method of claim 11, wherein the change in device status comprises a change in device status of the second hardware device, and wherein the change in the device status of the second hardware device comprises at least one of adding the second hardware device to a computing environment of the data parallel programming runtime, higher performance of the second hardware device as compared to the first hardware device, or higher performance per power of the second hardware device as compared to the first hardware device.

14. The method of claim 11, wherein analyzing the resource intersections further comprises analyzing the resource intersections of at least one of: the device capabilities of the first hardware device and the second hardware device, compatible context between the first hardware device and the second hardware device, or architecture class of the first hardware device the second hardware device.

15. The method of claim 14, wherein the at least one of the features or the attributes comprise at least one of device type, device make, device model, device features, device attributes, or device telemetry metrics, and wherein the device telemetry metrics comprise at least one of power consumption, load, resource utilization, memory utilization, network bandwidth, network throughput, or network latency.

16. A non-transitory machine readable storage medium comprising instructions that, when executed, cause at least one processor to at least:

execute, by a hardware processing device of the at least one processor that is communicably coupled to a plurality of heterogeneous hardware accelerator devices, a data parallel programming runtime that is to manage programming of the plurality of heterogeneous hardware accelerator devices;

identify, by the hardware processing device via the data parallel programming runtime, a change in device status that triggers a device transfer process from a first hardware device of the plurality of heterogeneous hardware accelerator devices, wherein the first hardware device is associated with a queue of an application program of the data parallel programming runtime, the queue used to connect the application program to the first hardware device;

analyze resource intersections between the first hardware device and a second hardware device of the plurality of heterogeneous hardware accelerator devices, wherein the resource intersections comprise at least resource intersections between device capabilities of the first hardware device and the second hardware device, and wherein the device capabilities comprise at least one of features or attributes of the first hardware device or the second hardware device;

determine, by the hardware processing device via the data parallel programming runtime, that the second hardware device is compatible with the first hardware device based on the resource intersections analyzed between the second hardware device and the first hardware device;

migrate at least one of a state or data of the first hardware device to the second hardware device;

logically map, by the hardware processing device via the data parallel programming runtime without user intervention, the queue to the second hardware device in the data parallel programming runtime, and cause queue requests for the queue to be emulated and diverted to the second hardware device; and initiate execution of the application program on the second hardware device using the queue.

17. The non-transitory machine readable storage medium of claim 16, wherein the change in the device status comprises a change in device status of the first hardware device, and wherein the change in the device status of the first hardware device comprises at least one of de-provisioning of the first hardware device from a computing environment of the data parallel programming runtime or removal of the first hardware device from the computing environment.

18. The non-transitory machine readable storage medium of claim 16, wherein the change in the device status comprises a change in device status of the second hardware device, and wherein the change in the device status of the second hardware device comprises at least one of adding the second hardware device to a computing environment of the data parallel programming runtime, higher performance of the second hardware device as compared to the first hardware device, or higher performance per power of the second hardware device as compared to the first hardware device.

19. The non-transitory machine readable storage medium of claim 16, wherein the at least one processor further to analyze the resource intersections of at least one of: the device capabilities of the first hardware device and the second hardware device, compatible context between the first hardware device and the second hardware device, or architecture class of the first hardware device the second hardware device.

20. The non-transitory machine readable storage medium of claim 19, wherein the at least one of the features or the attributes comprise at least one of device type, device make, device model, device features, device attributes, or device telemetry metrics, and wherein the device telemetry metrics comprise at least one of power consumption, load, resource utilization, memory utilization, network bandwidth, network throughput, or network latency.

* * * * *